United States Patent [19]

Kayser

[11] Patent Number: 4,955,953
[45] Date of Patent: Sep. 11, 1990

[54] LUBRICATING DEVICE

[75] Inventor: John P. Kayser, Madison, Wis.

[73] Assignee: KLS International Corporation, Madison, Wis.

[21] Appl. No.: 271,524

[22] Filed: Nov. 15, 1988

[51] Int. Cl.⁵ .............................................. F16N 13/00
[52] U.S. Cl. ........................................ 184/42; 184/7.4; 184/29; 417/399
[58] Field of Search ................... 184/39.1, 42, 7.4, 29; 417/399, 498

[56] References Cited

U.S. PATENT DOCUMENTS

| 271,077 | 1/1883 | Jewell | 184/29 |
|---|---|---|---|
| 1,603,902 | 10/1926 | Burdick . | |
| 1,944,919 | 1/1934 | Bischof | 103/154 |
| 1,967,251 | 7/1934 | McFerren | 184/6 |
| 2,011,165 | 8/1935 | Steiner | 103/154 |
| 2,104,590 | 1/1938 | Hill | 103/157 |
| 2,237,842 | 4/1941 | Reynolds | 299/140 |
| 2,239,987 | 4/1941 | Bramsen et al. | 299/140 |
| 2,614,495 | 10/1952 | Wiene | 103/2 |
| 2,664,969 | 1/1954 | Bjerre | 184/15 |
| 2,667,236 | 1/1954 | Graves | 184/7 |
| 2,719,603 | 10/1955 | Le Clair | 184/29 |
| 2,781,728 | 2/1957 | Fischer et al. | 417/399 |
| 2,953,305 | 9/1960 | Bondurant | 239/353 |
| 3,033,183 | 5/1962 | Erickson | 126/193 C |
| 3,245,621 | 4/1966 | Thomas | 239/424 |
| 3,330,541 | 7/1967 | Jackson | 261/23 |
| 3,602,434 | 8/1971 | Hruby, Jr. | 239/424 |
| 3,609,066 | 9/1971 | Wegmann | 184/39.1 |
| 3,656,693 | 4/1972 | Eckert | 239/410 |
| 3,693,757 | 9/1972 | Callahan | 184/29 |
| 3,888,420 | 6/1975 | Boelkins | 239/412 |
| 3,955,647 | 5/1976 | Tine et al. | 184/56 R |
| 4,076,173 | 2/1978 | Taccon et al. | 239/411 |
| 4,221,339 | 9/1980 | Yoshikawa | 239/704 |
| 4,236,674 | 12/1980 | Dixon | 239/296 |
| 4,360,132 | 11/1982 | Vilagi et al. | 222/504 |
| 4,784,584 | 11/1988 | Gruett | 417/399 |
| 4,834,218 | 5/1989 | Dombroski et al. | 184/3.1 |

Primary Examiner—Carroll B. Dority
Attorney, Agent, or Firm—Marshall, O'Toole, Gerstein, Murray & Bicknell

[57] ABSTRACT

A lubricating device for lubricating the flange of the wheel of a railroad car has a lubricant inlet port, a lubricant outlet port, and a piston assembly for causing a shot of lubricant to be delivered from the lubricant inlet port to the the lubricant outlet port. The piston assembly is pneumatically driven by means of compressed air which is supplied to the device at an air inlet port. The lubricating device includes a removable piston sleeve which allows for replacement of the sleeve when it is subject to wear.

2 Claims, 2 Drawing Sheets

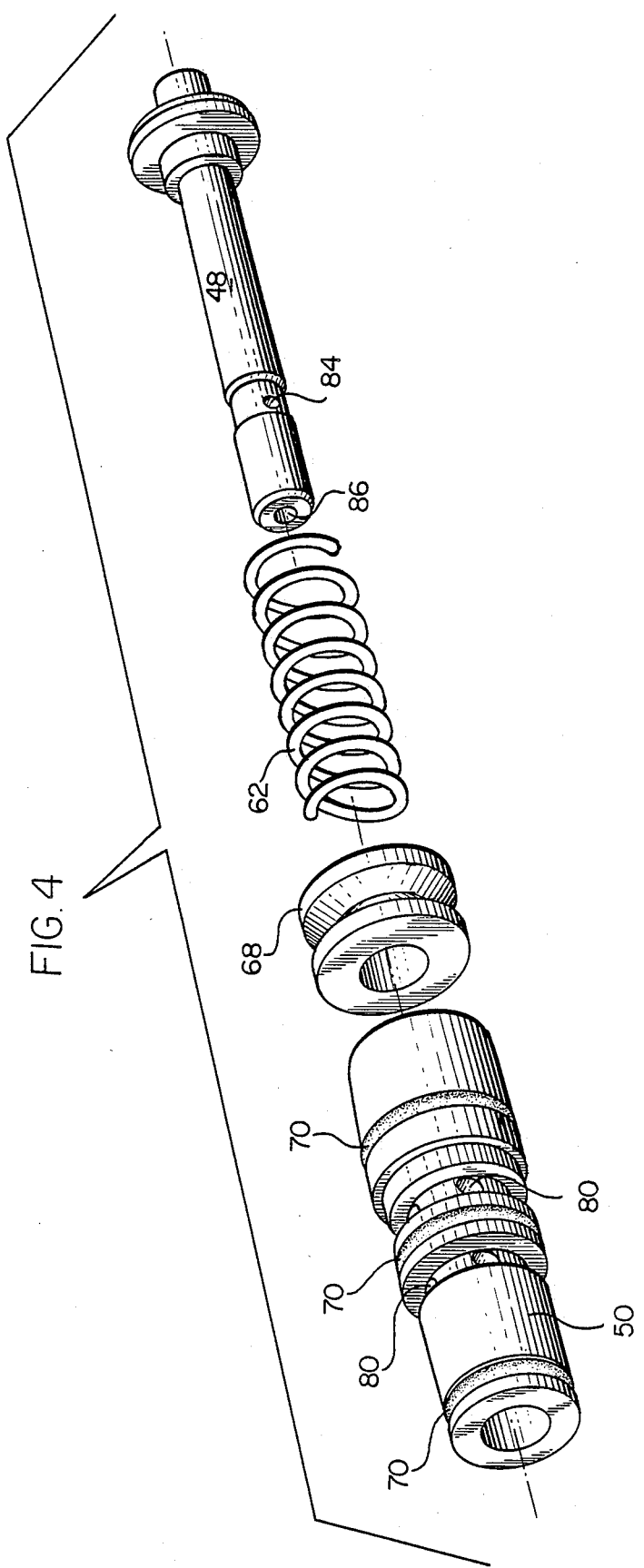

LUBRICATING DEVICE

BACKGROUND OF THE INVENTION

This invention relates to an apparatus for the application of lubricant, and more particularly to an apparatus for the application of lubricant to the flange of a locomotive wheel during operation of the locomotive.

An apparatus for the application of lubricant to the flange of a locomotive wheel is, described in U.S. Ser. No. 183,545, filed Apr. 16, 1988, now U.S. Pat. No. 4,834,218 and entitled "Improved Lubricating Nozzle Apparatus and Method," the disclosure of which is incorporated herein by reference. In that application, a lubricating apparatus for delivering a shot of lubricant to a surface to be lubricated is described as having a lubricant inlet port, a lubricant outlet port, and an air inlet port formed in a segmented housing. Lubricant is forced from the lubricant inlet to the lubricant outlet by means of a pneumatically driven piston and cylinder assembly which includes a first piston disposed for reciprocating movement within a piston chamber formed in the housing. A second, smaller-diameter piston operatively attached to the first piston reciprocates within the housing to cause shots of lubricant to be forced from the lubricant inlet port to the lubricant outlet port so that a desired surface may be lubricated.

Although the lubricating device described above has unique advantages, there are instances in which the device has certain disadvantages associated therewith. For example, during the operation of the lubricating device, the interior portion of the housing in which the second piston reciprocates is subject to wear. Consequently, the device needs to be periodically reconditioned. In order to recondition the device, a substantial portion of the segmented housing must be removed from the device, discarded, and replaced with a new housing segment. Such reconditioning is relatively tedious and time-consuming, and the need to replace a substantial portion of the housing is relatively costly. Another disadvantage is that since the second piston reciprocates within the housing, which is typically manufactured of non-hardened material, the rate of wear of the housing is higher than it otherwise could be, thus necessitating more frequent repairs of the lubricating device.

SUMMARY OF THE INVENTION

The present invention overcomes these disadvantages by providing a lubricating apparatus having a significantly improved structure. In particular, the apparatus of the present invention includes a pneumatically driven piston assembly which causes shots of lubricant to be delivered from a lubricant inlet port formed in a unitary housing to a lubricant outlet port formed in the housing. The piston assembly includes a first piston that reciprocates within a piston chamber formed within the housing. A second piston is operatively attached to the first piston and reciprocates within a removable piston sleeve disposed within the unitary housing. The piston sleeve is advantageously formed of a material hardened more than the housing material whereby the operating life of the apparatus is significantly increased without the need to engage in tedious and time-consuming reconditioning. In addition, when the apparatus does need reconditioning due to internal wear, the piston sleeve can simply be removed from the device and a new piston sleeve inserted in its place. Thus, reconditioning of the device is significantly simplified and less costly since no portion of the housing need be discarded in the process.

In the preferred embodiment of the invention, the piston sleeve is specially made to have a pair of strategically placed spaced, circumferential grooves or recesses formed therein. A first circumferential groove is preferably formed in the piston sleeve at a point approximately adjacent the lubricant inlet port, and the second circumferential groove is preferably formed in the sleeve at a point approximately adjacent the lubricant outlet port. Both of the circumferential grooves or recesses have a plurality of axially-spaced transverse bores formed therein to allow lubricant to pass through the sleeve.

The second piston is adjusted for longitudinal movement in the sleeve, the second piston adapted to move from a normally, inoperative position to an operative position whereby lubricant can exit the lubricant exit port. Another feature of the present invention is the provision of a special air chamber in fluid communication with the air inlet port that allows the first piston to be actuated by air supplied at high pressure in a transverse direction to a point on the circumference of the piston chamber instead of in a direction parallel with the axis of the piston chamber. The air chamber is formed by a circumferential groove in the first piston. As a result, the air passageway formed in the unitary housing is substantially simplified.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 4 is an exploded perspective view of a portion of the preferred embodiment shown in FIG. 3.

DETAILED DESCRIPTION OF THE PREFERRED EMBODIMENT

Figure 1:
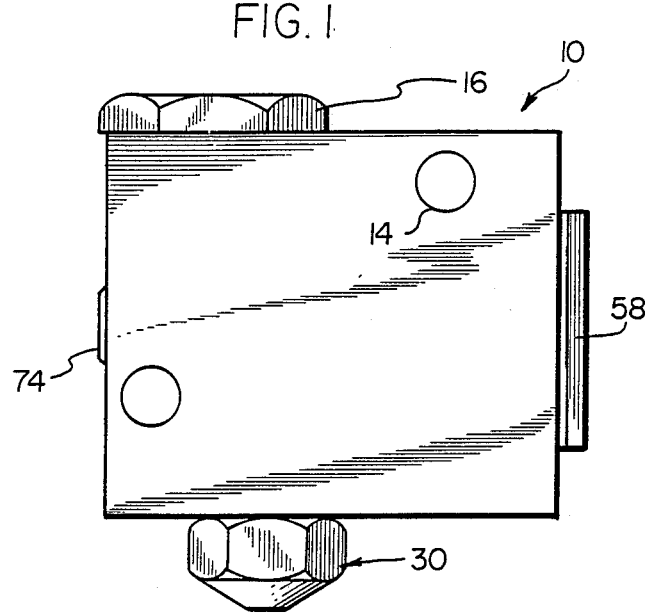
FIG. 1 is a top view of the preferred embodiment of the present invention.

A preferred embodiment of the invention is shown in FIGS. 1-4. Now referring to the Figures, a lubricating apparatus 10 in accordance with the invention includes a unitary housing 12 which may be fixed to a railroad car at a desired location by any suitable fastening means (not shown) via holes 14 so that the flange of a railroad car wheel may be lubricated.

A lubricant inlet nozzle 16 is threaded into the unitary housing 12. The lubricant inlet nozzle 16 has a hollow, threaded internal portion into which a lubricant supply hose (not shown) may be threaded. Lubricant from such a hose is typically supplied to the apparatus 10 at a pressure of 100 to 700 pounds per square inch (psi). A filter 18 is provided between the inlet nozzle 16 and a lubricant inlet port 20, which comprises two cylindrically shaped bores connected by a tapered bore. Filter 18, which filters impurities in the lubricant, is integrally formed with a rubber washer 22 which holds the filter in place in lubricant inlet port 20.

Figure 3:
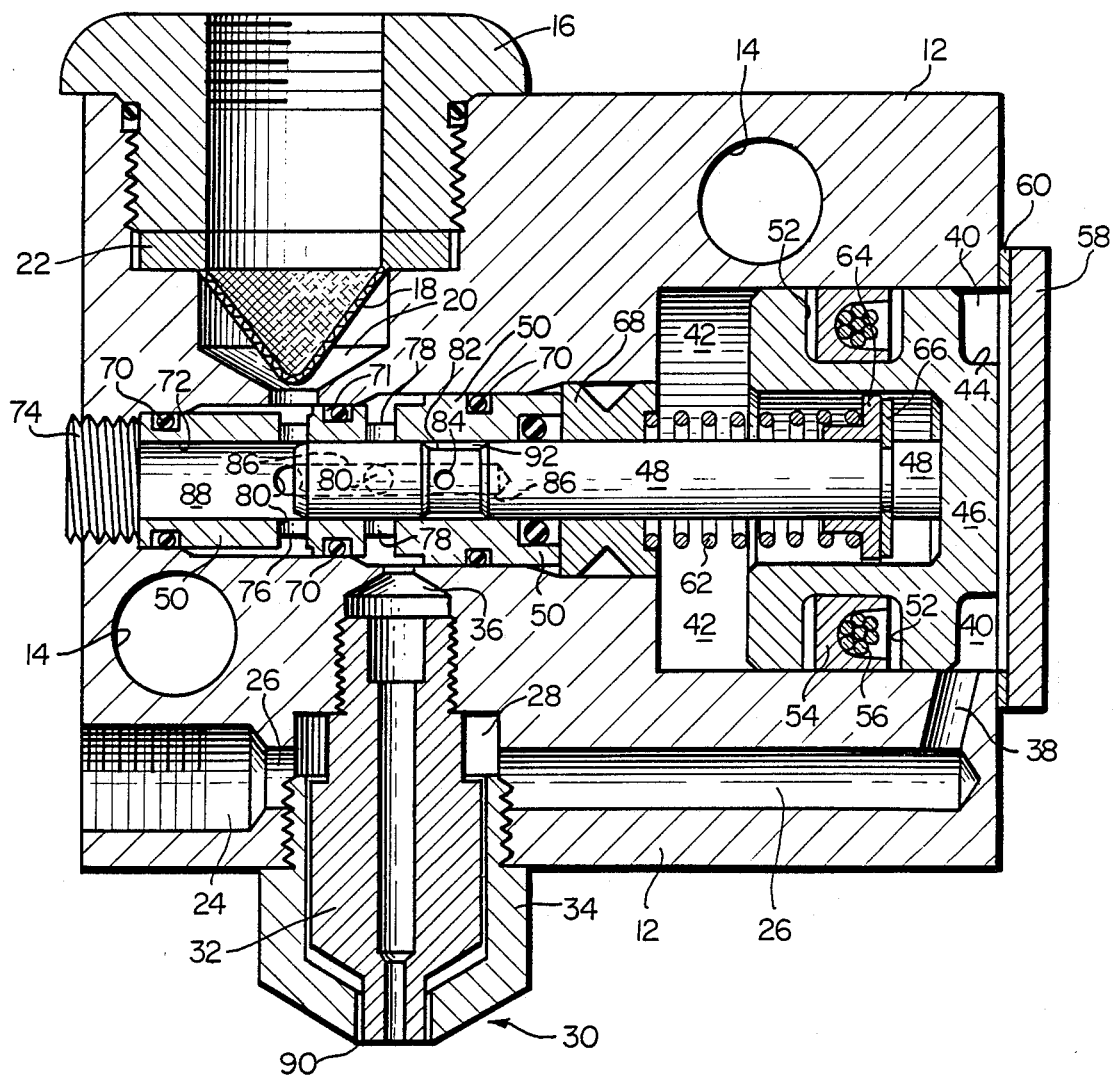
FIG. 3 is a cross-sectional view of the preferred embodiment of the present invention taken along lines 3—3 in FIG. 2.

An air inlet port 24 comprising a cylindrical and a tapered portion is formed in the housing 12. The air inlet port 24 has a threaded portion into which an air supply line (not shown) may be threaded. Preferably, pulses of compressed air at approximately 100 psi are supplied to the apparatus 10 in order to cause it to deliver shots of lubricant. The air inlet port 24 is in fluid communication with a bore 26 formed in the interior of the housing 12 coaxial with the air inlet port 24. A bore 28 in the housing 12 intersects bore 26 in a substantially, perpendicular direction as seen in FIG. 3.

An outlet nozzle assembly 30 is disposed in the bore 28. Nozzle assembly 30 includes an inner nozzle 32 and an outer nozzle 34. The inner nozzle 32 has a first threaded portion which is threaded into the housing 12, a second cylindrical portion coaxial with the threaded portion and having a slightly larger diameter than the threaded portion, a third cylindrical portion coaxial with the second portion and having a slightly larger diameter than the second portion, and a tapered portion leading to a cylindrical portion of the smallest diameter and disposed within a bore formed in the outer nozzle. The inner nozzle 32 has an internal bore of varying diameter formed along its entire length. The portion of the internal bore having the largest diameter is in fluid communication with a lubricant outlet port 36 comprising two cylindrically shaped bore sections connected by a tapered bore section.

The outer nozzle 34 is threaded into the housing 12 over the inner nozzle 32. The outer nozzle 34 has a bore formed at its tip which has an inner diameter slightly larger than the outer diameter of the tip of the inner nozzle 32. The inner diameter of the remainder of the outer nozzle 34 is slightly larger than the outer diameter of the inner nozzle 32. In an alternative embodiment, the portion of the inner nozzle 32 adjacent the larger inner bore of the outer nozzle 34 may be hexagonally shaped. In either embodiment, due to the difference in diameters between the inner diameter of the outer nozzle 34 and the outer diameter of the inner nozzle 32, there is an air passageway from the air inlet port 24 to bores 26 and 28 and through the outlet nozzle assembly 30 between the inner nozzle 32 and the outer nozzle 34. As a result, when compressed air is supplied to the air inlet port 24, a first stream of compressed air will exit at the circular gap between the inner nozzle 32 and the outer nozzle 34 and exit device 12 at the annular ring formed by the spaced nozzles 32, 34.

A second air passageway comprises air inlet port 24, bore 26, bore 28, bore 26 and a bore 38 formed approximately perpendicular to the bore 26. The bore 38 is in fluid communication with an air chamber 40 formed in the interior of a cylindrical piston chamber 42 by means of an circumferential groove 44 formed in a piston 46. The inclusion of air chamber 40 in the piston chamber 42 allows the piston 46 to be actuated by compressed air supplied through bore 38 in a transverse direction at a point on the circumference of the piston chamber 42. As a result, the necessity of having a bore aligned with and parallel to the piston 48 is obviated, and the air passageway for actuating the piston assembly is significantly simplified.

The piston 46 is part of a piston assembly which includes piston 46, a second, smaller-diameter piston 48 which is operatively connected to piston 46 by means of its abutment with the piston 46, and a piston sleeve 50 in which piston 48 reciprocates. The piston 46 has an annular groove or recess 52 in which an annular resilient cup 54 having a U-shaped cross-section is disposed. Strands of wool yarn 56 soaked in oil are provided in the U-shaped cross section of the cup 54 to provide lubrication for the piston 46.

Piston 46 is spring-biased against a removable end cap 58 by means of a spring assembly 62. The end cap 58 is provided with a gasket 60 so that an air-tight seal is provided for the piston chamber 42. The end cap 58 may be secured to the housing 12 by any suitable releasable fastening means (not shown) via holes 61 (shown only in FIG. 2).

The spring assembly includes a spring 62, a spring bushing 64, and a retaining ring 66 mounted in a circumferential groove in the piston 48. The end of the spring 62 opposite the piston 46 contacts a bushing 68 which is flush against the piston sleeve 50.

Figure 2:
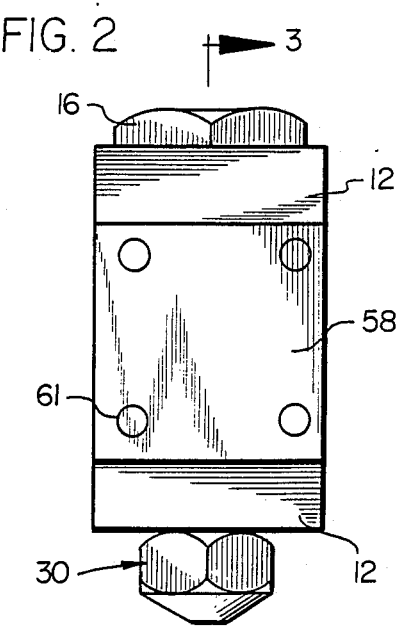
FIG. 2 is a side view of the preferred embodiment of the present invention.

The piston sleeve 50, which is preferably made of a hardened material such as tool steel or tungsten carbide, is removably disposed in a bore formed in the interior of the housing 12. Three spaced O-rings 70 are located on the outer surface of sleeve 50, each O-ring being disposed within a groove or recess 71. Piston sleeve 50 has a constant-diameter internal bore 72 through its center extending from one end of said sleeve to a distance along the sleeve length as shown in FIG. 2. Sleeve 50 abuts bushing 68 at one of its ends while screw stop 74 abuts the remaining end of sleeve 50. The piston sleeve 50 also includes two other spaced circumferential grooves or recesses 76, 78, groove 76 being located at a point approximately adjacent the lubricant inlet port 20 and groove 78 being located at a point approximately adjacent the lubricant outlet port 36. Each groove 76, 78 formed in the piston sleeve 50 has four circumferentially-spaced transverse bores 80. In particular, the axis of each bore 80 is perpendicular to the central longitudinal axis of the piston sleeve 50, and there is a circumferential spacing of 90° between each bore 80.

Piston 48, a portion of which is adapted to be disposed within the longitudinal bore 72 of sleeve 50, has a circumferential groove or recess 82 formed in its outer surface. The circumferential groove or recess 82 has a single transverse bore 84 formed therein so that the hollow interior of the piston 48, which is formed by a longitudinal axis bore 86 which extends from one end of piston 48 to the transverse bore 84, is in fluid communication with the interior walls of the piston sleeve 50 adjacent the circumferential groove 82.

OPERATION OF THE PREFERRED EMBODIMENT

The lubricating apparatus 10 just described delivers a shot of lubricant via the outlet nozzle assembly 30. The apparatus 10 as shown in FIG. 3 is in its non-actuated position.

In this non-actuated position, the piston 46 is spring-biased against the end cap 58 by means of the spring 62. Consequently, lubricant is forced from the lubricant inlet port 20 under high pressure, e.g. 100 to 700 psi, through the four transverse bores 80 formed in the circumferential groove 76 in the piston sleeve 50 and into a lubricant holding chamber, which includes the interior portion 88 of sleeve 50 sealed by screw stop 74, longitudinal bore 86 and the space 92 formed by the groove 82 in the piston 48 and the interior wall of the sleeve 50. This lubricant holding chamber holds the "shot" of lubricant to be delivered upon the piston assembly being forced into its actuated position.

When compressed air is provided to the air inlet port 24, two separate air flows are created in the lubricating apparatus 10. A first air flow is provided from the air inlet port 24 through bores 26, 28 and through the outlet nozzle assembly 30 at the location of the annular gap 90 between the inner nozzle 32 and the outer nozzle 34. The air flow provided at the tip of the outlet nozzle assembly 30, as explained in the patent application identified above, directs a shot of lubricant emitted from the inner nozzle 32 to the location of lubrication.

The compressed air travels a second path from the air inlet port 24 through the bores 26, 28, and 38 and into the air chamber 40, where it overcomes the force of spring 62 and forces piston 46 to move against biased piston 48 to cause piston 48 to move inward of sleeve 50. Just prior to actuation, when the piston 48 is in its non-actuated position as shown in FIG. 3, lubricant, under pressure, is disposed within and occupies the lubricant holding chamber 88, as previously described herein. When actuated by the compressed air, piston 46 rapidly forces piston 48 from right to left in FIG. 3 inside the piston sleeve 50 such that longitudinal movement of piston 48 closes off the four transverse bores 80 in the circumferential groove 76 in the piston sleeve 50 whereby the lubricant inlet chamber 20 no longer is in fluid communication with the lubricant holding chamber. At about the same time that the lubricant holding chamber is blocked off by the piston 48, the circumferential groove 82, which is part of the holding chamber, moves with the piston 48 so that it is aligned in fluid communication with the lubricant outlet port 36. As a result, a shot of lubricant that was temporarily stored in the holding chamber is released into port 36, through the inner nozzle 32 to the lubricant outlet port or nozzle 34.

Subsequently, the spring 62 forces the piston 48 to its non-actuated position as shown in FIG. 3, and the lubricant holding chamber is loaded with lubricant which will be ejected from the nozzle 30 in the manner previously described.

After repeated operation, the piston sleeve 50 will be subject to wear so that the efficient operation of the lubricating apparatus 10 may be impaired. In this case, the apparatus 10 may be repaired simply by removing the end cap 58, piston 46, piston 48, and piston sleeve 50. Piston sleeve 50 may be replaced with a new piston sleeve as required, and optionally, the piston 48 may be replaced with a new piston. After the insertion of the new piston sleeve and/or piston, the end cap 58 is replaced. No new housing components are required. Moreover, because the sleeve is made originally of a hardened material, the remaining portion of the lubrication can be cast or fabricated from a relatively inexpensive material. Further, the sleeve appears to last for a substantial period of time.

The lubricating device 10 described herein is thus subject to being reconditioned in this very simple manner. The cost of such reconditioning is low since the time required is reduced as well as the cost of replacement parts since no portion of the device housing needs to be discarded.

Modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A lubricating device for delivering a shot of lubricant to an area to be lubricated, said lubricating device having a piston assembly that includes a replaceable piston sleeve which can be easily replaced, said lubricating device comprising:

a housing;

a lubricant inlet port formed in said housing;

an air inlet port formed in said housing;

a lubricant outlet port;

a piston assembly disposed in said housing, said piston assembly comprising:

a first piston disposed in a piston chamber in said housing;

a piston sleeve removably disposed in said housing, said piston sleeve having a first outer circumferential groove located approximately adjacent said lubricant inlet port and a second outer circumferential groove located approximately adjacent said outlet port, a first set of circumferentially-spaced transverse bores being formed in said first circumferential groove in said piston sleeve and a second set of circumferentially-spaced transverse bores being formed in said second circumferential groove, said first set of circumferentially-spaced bores allowing lubricant to pass from said lubricant inlet port to a lubricant holding chamber formed in the interior of said piston sleeve when said piston assembly is in a first, non-actuated position, and said second set of circumferentially-spaced bores allowing the lubricant in said holding chamber to be forced from said holding chamber to said outlet port when said piston assembly is forced into a second, actuated position;

a second piston disposed for reciprocating movement within said piston sleeve, said second piston being operatively connected to said first piston whereby said second piston causes a shot of lubricant to be provided to said outlet port upon actuation of said first piston by compressed air from said air inlet port, a portion of the interior of said second piston being hollow, said second piston having an outer circumferential groove and a transverse bore formed in said groove; and a removable cover for making a fluid-tight seal with said housing whereby upon removal of said cover, said piston assembly can be removed from said housing, said piston sleeve can be replaced with a new piston sleeve, and said piston assembly can be reinserted into said housing with said new piston sleeve, wherein said housing includes an air passageway in fluid communication with said air inlet, said air passageway joining said piston chamber at a point on the circumference of said piston chamber, said piston chamber including an air chamber so that said first piston may be forced by air pressure from a first, non-actuated position in said piston chamber to a second, actuated position within said piston chamber.

2. A lubricating device for delivering a shot of lubricant to an area to be lubricated, said lubricating device comprising:
- a housing;
- a lubricant inlet port formed in said housing;
- an air inlet port formed in said housing;
- a lubricant outlet port through which lubricant may pass to an area to be lubricated;
- a piston assembly disposed in said housing, said piston assembly comprising:
  - an actuating piston in fluid communication with said air inlet port and disposed for movement within said housing upon changes in air pressure at said air inlet port;
  - a piston sleeve removably disposed entirely within said housing, said piston sleeve having a first outer circumferential groove approximately adjacent said lubricant inlet port and a second outer circumferential groove approximately adjacent said lubricant outlet port, said first outer circumferential groove having a first set of circumferentially-spaced transverse bores formed therein and said second outer circumferential groove having a second set of circumferentially-spaced transverse bores formed therein,
  - said first set of circumferentially-spaced bores allowing lubricant to pass from said lubricant inlet port to a lubricant holding chamber formed in the interior of said piston sleeve when said piston assembly is in a first, non-actuated position, and
  - said second set of circumferentially-spaced bores allowing the lubricant in said holding chamber to be forced from said holding chamber to said outlet port when said piston assembly is forced into a second, actuated position; and
- a lubricant piston in fluid communication with said lubricant inlet port and said lubricant outlet port, said lubricant piston being disposed for reciprocating movement within said piston sleeve and being operatively connected to said actuating piston for delivering a shot of lubricant from said lubricant inlet port to said lubricant outlet port upon movement of said actuating piston, a portion of the interior of said lubricant piston being hollow and said lubricant piston having an outer circumferential groove and a transverse bore formed therein.

* * * * *